United States Patent [19]

Merry et al.

[11] 3,829,564

[45] Aug. 13, 1974

[54] COATED PRODUCTS FOR VETERINARY USE

[75] Inventors: Lorraine Anne Merry; David Henry Solomon, both of Victoria, Australia

[73] Assignee: Commonwealth Scientific and Industrial Research Organization, East Melbourne, Victoria, Australia

[22] Filed: Feb. 14, 1973

[21] Appl. No.: 332,518

Related U.S. Application Data

[62] Division of Ser. No. 55,968, July 17, 1970, abandoned.

[52] U.S. Cl.............. 424/78, 424/32, 426/89, 426/92, 426/93, 426/96, 426/98
[51] Int. Cl...... A23k 1/00, A23k 3/00, A61k 27/00
[58] Field of Search............ 424/32, 78; 426/89, 92, 426/93, 96, 98

[56] References Cited
UNITED STATES PATENTS 3,492,398   1/1970   Marco et al. ......................... 424/32
3,619,200   11/1971  Ferguson ............................. 424/32

Primary Examiner—Sam Rosen

[57] ABSTRACT

Copolymers and terpolymers consisting essentially of (a) a basic substituted acrylate or methacrylate; and (b) at least one ethylenically unsaturated compound selected from vinyl aromatic hydrocarbons, vinyl esters, normal and branched chain alkyl esters of acrylic and methacrylic acids, and acrylonitrile.

The polymers which are substantially insoluble in aqueous media at pH6 or more but soluble at pH3 or less are used as coatings for nutrient or therapeutic substances for administration to ruminants. The substances thus are rendered resistant to attack and breakdown in the rumen.

8 Claims, No Drawings

COATED PRODUCTS FOR VETERINARY USE

This is a division, of application Ser. No. 55,968 filed July 17, 1970, and now abandoned.

This invention is concerned with new copolymers and terpolymers and with the use of such materials in the treatment of nutritional or therapeutic substances for administration to ruminant animals. The invention is concerned particularly with the production of treated feeds or feed supplements, especially proteins or amino acids for increasing the efficiency of wool production in sheep, although it is also applicable to sheep and other ruminants for increasing body-growth and meat production, for increasing milk production and for generally decreasing the feed-intake required for the maintenance of such animals.

Our Australian Pat. Application No. 7,198/66 describes protein and amino acid feed supplements in which the feed material is rendered resistant to microbial attack and break-down during normal residence times within the rumen of a ruminant animal but remains susceptible to break-down and digestion within the abomasum and small intestine of the animal. As described in our prior application, this may be achieved by treating proteinaceous materials with substances which are capable of reacting with proteins to form a polymeric proteinaceous complex on the surface of the material, or by treating the proteinaceous material with a polymer or copolymer of a basic vinyl or acrylic monomer. Notable among the monomers which are suitable for this purpose are tertbutylaminoethyl methacrylate and dimethylaminoethyl methacrylate — hereinafter referred to as TBAEMA and DMAEMA respectively — and it is with copolymers and terpolymers formed from these compounds that the present invention is particularly concerned.

Our prior application makes reference to homopolymers of TBAEMA and DMAEMA and also to copolymers of TBAEMA with styrene, such copolymers containing at least 50 percent of TBAEMA. However, TBAEMA and DMAEMA are expensive materials and thus their homopolymers or copolymers containing a high proportion of these monomers are not particularly suitable on economic grounds as coatings for protein or amino-acid materials. Furthermore, the solubility characteristics of the homopolymers and, as indicated in our prior application, copolymers containing 50 percent or more of TBAEMA, are such that they are not particularly effective in protecting casein against microbial attack. We have now found that a number of copolymers and terpolymers of DMAEMA and TBAEMA which contain 50 percent or less of these monomers are remarkably effective in protecting amino acids and proteins from attack in the rumen while still permitting the break-down and digestion of the amino acids or proteins in the abomasum and small intestine of a ruminant animal and also have economic advantages by virtue of their comparatively low content of the amino monomers.

It is an object of the present invention to provide new copolymers and terpolymers of basic substituted acrylate and methacrylate monomers.

A further object is to provide new polymeric materials suitable for use in the coating of proteinaceous or amino acid feedstuffs or feed supplements for ruminant animals and furthermore to provide such materials which are essential insoluble in the rumen fluids but which are soluble in the fluids of the abomasum of such animals.

A still further object is to provide feed stuffs or feed supplements for ruminant animals which are resistant to attack in the rumen fluids of such animals but are available for digestion and assimilation in the abomasum or small intestine of such animals.

We have observed that a useful criterion in selecting suitable co- and perpolymers for this purpose is the differing solubilities of the polymeric materials at pH3 (the pH of the abomasum) and pH6 (the pH of the rumen). Broadly speaking, copolymers which remain insoluble at pH 6 or higher for at least about twenty hours but are soluble within three hours at pH3 or lower, are most likely to be suitable for use in accordance with the present invention. These criteria have been arrived at by consideration of the conditions normally existing in the digestive system of the sheep. For normal feedstuffs the residence time in the rumen is about 20 hours and the residence time in the abomasum and lower intestine is rarely more than 4 hours and frequently less than 2 hours.

Throughout this specification the term "polymer" is to be interpreted, where the context permits, to include polymers formed from two or more monomers. The terms "copolymer" and "terpolymer" have been generally used to mean polymers formed from two and three monomers respectively. However, this should not be interpreted to mean that the invention is restricted to three component polymers as polymers containing four or even more monomers are contemplated by the invention.

In its broadest aspect, the present invention provides copolymers and terpolymers consisting essentially of (a) a basic substituted acrylate or methacrylate monomer of the general formula I:

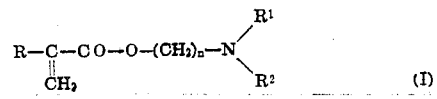

wherein R is hydrogen or a methyl group;
$R^1$ is hydrogen or a normal or branched chain alkyl group;
$R^2$ is hydrogen or a normal or branched chain alkyl group;
and $n = 2$, 3 or 4; and
(b) at least one ethylenically unsaturated compounds selected from the group consisting of vinyl aromatic hydrocarbons, such as styrene and methylstyrene, and including substituted compounds of this type; vinyl esters, such as vinyl acetate and vinyl propionate; normal and branched chain alkyl acrylates and methacrylates, containing from one to 10 carbon atoms in the alkyl chain, such as ethyl and butyl acrylates, and methyl, ethyl, butyl, and 2-ethyl-hexyl methacrylates; and vinyl monomers, such as acrylonitrile.

Preferably the alkyl groups $R_1$ and $R_2$ referred to above have from one to four carbon atoms.

The preferred copolymers and terpolymers of the invention are those formed from the substituted methacrylate monomers (i.e. Formula I; $R = CH_3$) and especially preferred monomers are dimethylaminoethyl methacrylate (Formula I; $R = CH_3$; $R^1 = R^2 = CH_3$; $n = 2$) and tert-butylaminoethyl methacrylate (Formula I; R=CH$_3$; R$^1$ = tert-butyl, i.e. C(CH$_3$)$_3$; R$^2$ = H; $n = 2$).

The preferred co-monomers are styrene, methyl methacrylate, vinyl acetate and ethyl acrylate and thus in accordance with one preferred aspect of the present invention, there is provided a copolymer of: (a) a monomer selected from the group consisting of DMAEMA and TBAEMA; and (b) a monomer selected from the group consisting of methyl methacrylate, styrene, vinyl acetate and ethylacrylate.

As will be shown hereinafter, copolymers formed from one of the monomers (a) and either vinyl acetate or ethyl acrylate are not particularly suitable for use in the present invention in view of their undesirable physical properties. The preferred copolymers in accordance with this invention, therefore, are formed from one of the monomers (a) defined above together with methyl methacrylate or styrene.

Specifically preferred copolymers in accordance with this invention are formed from 20 to 50 percent, more preferably 25 to 50 percent, of DMAEMA or TBAEMA with the balance being either styrene or methyl methacrylate.

While the preferred copolymers of the invention all fall within the composition range as defined above, there are within this range certain well preferred combinations which are set out in Table I below.

TABLE I

|  | DMAEMA | TBAEMA |
|---|---|---|
| S | 50 – 65 | 55 – 60 |
| MMA | 70 – 75 | 65 – 70 |

The figures which appear in the table indicate the percentage by weight of styrene (S) or methyl methacrylate (MMA) monomer respectively, in the copolymer.

Films and coatings prepared from the abovedefined copolymers, especially those containing methyl methacrylate, may tend to be brittle. Also the copolymers may lack the degree of adhesiveness necessary for good bonding to the substrate materials contemplated by this invention. These defects can be overcome, if desired, by the addition of an external plasticizer, for example esters of phthalic acid, such as the dibutyl, butyl-benzyl and dioctyl phthalates, and other plasticizers known per se for use with acrylate polymers. We have observed good results using 5 – 10 percent by weight of dibutyl phthalate. We have found, however, that the copolymers of the invention can be internally plasticized by the incorporation of a third monomer component to form a terpolymer. Many of the ethylenically unsaturated monomers referred to above can be used for this purpose. The preferred third components are vinyl acetate and ethyl acrylate. The use of an internal plasticizer also reduces the proportion of the basic monomer required, thus further lowering the cost of the polymer.

Thus in accordance with a further preferred aspect, this invention provides a terpolymer consisting essentially of (a) a monomer selected from the group consisting of DMAEMA and TBAEMA: (b) a monomer selected from the group consisting of styrene and methyl methacrylate; and (c) a monomer selected from the group consisting of vinyl acetate and ethyl acrylate.

In general the preferred terpolymers will contain 20–35 percent by weight of the amino-monomer (DMAEMA or TBAEMA) but the proportions of the other two component monomers will vary greatly depending on which pair is chosen. For ethyl acrylate terpolymers we have found that satisfactory terpolymers are formed using 5 to 25 percent of ethyl acrylate and 50 to 70 percent of styrene or methyl methacrylate (based on the total weight of monomers). For terpolymers with vinyl acetate the figures are 20 to 60 percent of vinyl acetate and 15 to 50 percent of styrene or methyl methacrylate. Within these broad ranges there are specifically preferred combinations and ranges of preparations which are considered to be particularly useful as coatings in accordance with the invention. Most suitable are the terpolymers of styrene and ethyl acrylate with the amino methacrylate monomers set out in Table II(a) (all percentages are based on the total weight of the monomers). Terpolymers with styrene and vinyl acetate are more difficult to prepare but are still useful in the compositions of the invention. Preferred compositions are set out in Table II(b). The terpolymers with methyl methacrylate and either ethyl acrylate or vinyl acetate are generally considered to be of less potential value as coatings. Nevertheless the compositions set out in Tables II(c) and (d) possess the necessary solubility characteristics and are thus considered to fulfil the broad objectives of this invention.

TABLE II

|  | (a) | (b) | (c) | (d) |
|---|---|---|---|---|
| DMAEMA) or TBAEMA ) | ) 25–35 ) ) | ) 25–35 ) ) | 25 30 | 20–25 — |
| S | 50–60 | 30–50 | — | — |
| MMA | — | — | 50–70 | 50–65 | 15–30 |
| EA | 10–15 | — | 5–25 | 5–20 | — |
| VA | — | 20–45 | — | — | 45–60 |

The copolymers and terpolymers of the invention can be prepared by methods known per se, for example bulk, suspension, solution or emulsion polymerization. Polymerization may be initiated by free radicals produced, for example, by heat, irradiation or the use of free radical-type initiators. The latter are usually thermally unstable compounds and include, for example, peroxides, such as cumene hydroperoxide or benzoyl peroxide and tertiary butyl hydroperoxide or nitrogen containing initiators such as azo-diisobutyronitrile. Generally the amount of initiator employed will be from 0.05 to 2 percent by weight of the monomers to be polymerized.

The aminoalkyl methacrylate monomers can be used in either the free base or salt form. The former is preferred for solution polymerization.

Suitable solvents include aliphatic hydrocarbons, such as hexane; aromatic hydrocarbons, such as benzene and toluene; halogenated hydrocarbons, such as trichloroethylene and chloroform; aliphatic esters, such as ethyl acetate or ketones such as acetone and methyl ethyl ketone, The last-mentioned solvent has proved especially suitable although aromatic hydrocarbon solvents are also advantageous for styrene-containing copolymers and terpolymers.

Emulsion polymerisation using the salt form of the aminoethyl methacrylate can be carried out using water soluble initiators, such as ammonium persulphate. Emulsifiers may be added if necessary. The basic copolymers or terpolymers are thus produced in salt form from which they may be liberated as the free base by the addition of alkali.

Generally emulsion polymerisation is more suitable for copolymers and terpolymers of methyl methacrylate than for styrene-containing polymers. Solution polymerisation, however, is regarded as the more suitable technique for both types.

In another aspect, this invention provides a nutrient or therapeutic composition or supplement for ruminant animals, comprising the combination of a nutrient or therapeutic material and one of the hereinbefore described copolymers or terpolymers, said combination being of such form that the material is thereby rendered resistant to attack and breakdown within the rumen of the animal but remains susceptible to breakdown and digestion within the abomasum or small intestine of the animal.

The nutrient or therapeutic material may be in the form of discrete bodies or particles having a substantially continuous surface coating of the copolymer or terpolymer or it may be a mixture in which particles of the material are dispersed throughout a matrix of the copolymer or terpolymer. Other combinations are also possible, such as an agglomeration of individually surface coated particles bonded together by the same or another copolymer or terpolymer.

Where appropriate, the nutrient or therapeutic composition may be in the form of a comparatively large body such as a tablet or lozenge. Generally, however, the composition will be in the form of small-sized particles, preferably of the order of about 1 m.m., more preferably between 0.1 and 1 m.m. Particles of this size can readily pass between the rumen and the abomasum and are not readily trapped by froth in the rumen. For similar reasons the density of the compositions should be as near as practicable to unity.

The invention is principally concerned with feed compositions or supplements containing natural or synthetic amino acids or proteinaceous feed materials of plant, animal or synthetic origin. Suitable amino acids, which are of importance to the diet of ruminant animals are methionine, lysine, cysteine, cystine. Also included are amino acid analogues and derivatives such as the hydroxy analogue of methionine.

A wide variety of proteinaceous feed materials can be used. These can be preparations of waste meat, fish meals and oils, or by-products of the meat industry. They may also include protein-rich plant products and preparations such as meals, pellets, concentrates or the like formed from grains, nuts, beans and protein-rich chaffs or loaf silage. Suitable ingredients would therefore be, for example, oats, barley, soya beans, peanuts, linseed, cotton seed, vegetable oils, lucerne meal, and a variety of dairy by-products such as casein.

Therapeutic substances include antibiotics, such as procaine penicillin G, bacitracin, streptomycin, erythromycin, chlorotetracyline and oxytetracycline; sulpha drugs, such as sulphamezathine and sulphanilimide; sedatives, such as amytol and phenobarbital; anthelmintics, such as phenothiazine and piperazine derivatives; antipyretics, such as asprin; hormones, such as the androgenic and estrogenic steroids and the corticosteroids; hypoglycemic agents, antispasmotics, hematics, laxatives and expectorants. The incorporation of these materials into compositions of the type envisaged by this invention will be advantageous where the materials would break down in, or disturb the normal functions of, the rumen.

Furthermore, any two or more of these nutrient or therapeutic agents may be combined in the compositions of the invention. In addition the compositions may include biologically inert adjuvants or filler materials to adjust the density or other physical properties of the compositions as discussed above.

The invention also extends to include a method for rendering a nutrient or therapeutic material resistant to microbial attack within the rumen of ruminant animals which method comprises the step of treating the material with one of the hereinbefore described copolymers or terpolymers in such manner that the material is thereby rendered resistant to attack and breakdown within the rumen of the animal but remains susceptible to breakdown and digestion within the abomasum or small intestine of the animal.

Such a treatment may involve the coating of discrete bodies or particles of the nutrient or therapeutic material with the copolymer or terpolymer or the incorporation of such bodies or particles into a matrix of the copolymer or terpolymer. Another alternative is the pre-coating of such particles followed or accompanied by agglomeration of the coated particles into larger aggregates held together by the same or a different copolymer or terpolymer.

In order that the compositions of the invention, particularly those containing amino acids or proteinnaceous materials, may be adequately protected, it is necessary to ensure that treatment of the particles results in at least the surface portion of each particle being coated or encapsulated as completely as possible with the polymeric material, i.e. the copolymer or terpolymer. Pinholes and other discontinuities in the coating may allow attack on the material by rumen microflora. The use of fairly thick coatings or multiple coating techniques is thus advisable but on the other hand excessively thick coatings are generally to be avoided both for economic reasons and because of possible inhibition of coating breakdown in the abomasum or intestine.

The actual treatment employed will depend, of course, on the type of composition produced. Incorporation of particular nutrient or therapeutic material into a polymeric matrix can be achieved by dispersing the particulate material in a solution of the polymer in a suitable medium and removing the solvent medium. Methods known per se, for example spray drying, may be used to produce droplets of the polymer/particle dispersion prior to solvent evaporation.

If the particles are to be provided with a surface coating of the polymer, any suitable coating technique may be employed. In general, we have found that the most effective methods are those where the polymer is applied in solution in suitable solvent which is subsequently allowed to evaporate. Such a solution may be applied by spraying, dipping or tumbling but each of these methods has its disadvantages.

More sophisticated coating methods may be used to advantage, including flowing-stream, fluidized-bed or spray-drying techniques. In the first of these the material to be coated in liquid or slurry from is extruded coaxially into a flowing steam of the liquid coating material (or a solution thereof). By adjustment of the parameters of the system, one or both streams may be made unstable whereby droplets containing the first material are formed and become surrounded by the coating material.

In fluidized-bed techniques the material to be coated- which, as mentioned above, will generally be in the form of small particles (O.l to 1 m.m.) - is suspended in a flowing fluid stream, into which is introduced the coating material in liquid or solution form. Conditions are arranged so that the coating material adheres to the suspended particles and that, if necessary, any solvent present is evaporated. Such a process can be operated as a batch process or provision may be made for continuous removal of the coated particles.

We have found that for the three-sixteenths inch tablets of the amino acid methionine used in the investigational work described hereinafter satisfactory coatings are produced by hand-dipping the tablets into a solution of the polymer in a suitable solvent, for example methyl ethyl ketone or trichloroethylene. Using a 30 percent solution of the polymer and two applications, coatings amounting to about 6 percent by weight, based on the weight of the tablet, and a thickness of about 0.0015 inch (approx. 0.04 m.m.) are produced. It should be noted, however, that these figures are merely illustrative and that obviously the coatings produced by other techniques may vary substantially in weight and thickness.

Generally for smaller particles, 0.1 to 1 m.m, coating thicknesses are maintained at about 0.001 inch to 0.0015 inch (0.025 to 0.04 mm), which usually corresponds to a weight of coating equal to 30 percent by weight of the material to be coated.

In a modification of the above-described techniques, the copolymer or terpolymer may be formed in situ by polymerizing the component monomers in the presence of the nutrient or therapeutic material.

In a further aspect, this invention provides a method of treating ruminant animals, which comprises administering to the animal a nutrient or therapeutic composition or supplement which comprises a combination of a nutrient or therapeutic material and one of the hereinbefore described copolymers or terpolymers, said combination being of such form that the material is thereby rendered resistant to attack and breakdown within the rumen of the animal but remains susceptible to breakdown and digestion within the abomasum or small intestine of the animal.

In order that the present invention in its various aspects may be more fully and completely understood, examples will now be given showing the preparation, characterization, properties and uses of typical copolymers and terpolymers, and animal feed supplements all in accordance with the invention. These examples, however, are not to be construed as limiting on the invention. Except where otherwise indicated, all parts and percentages are by weight and temperatures are uncorrected.

EXAMPLE 1

Preparation of copolymers

The copolymers listed in Table III below were prepared by the following genetal method.

500 ml. of methyl ethyl ketone was placed in 1 2-liter flask fitted with a condenser, stirrer, thermometer and a separating funnel (used for adding the monomers). The solvent was heated under reflux and the monomer mixture (500 ml.) in which was dissolved $\alpha,\alpha'$—azoisobutyronitrile (2 percent on the weight of monomers) was added at a constant rate over a period of 1½ hours. The mixture was heated and stirred for a further 12 hours. The solvent and any unchanged monomers were removed by distillation under reduced pressure (on a rotary evaporator).

EXAMPLE 2

Solubility testing of copolymer

In order to assess their potential as coatings for feed supplements, films of each copolymer (Table III) were prepared by dissolving the copolymer in methyl ethyl ketone and coating a glass or nylon mesh with the solution. After evaporation of the solvent the coated mesh was shaken in buffer solutions (citrate-phosphate) at pH3 and pH6 to determine the solubility characteristics. The results are shown in Table III.

TBAEMA = tert.-butylaminoethyl methacrylate
DMAEMA = diethylaminoethyl methacrylate
MMA = methyl methacrylate
S = styrene
VA = vinyl acetate
EA = ethyl acrylate

TABLE III

SOLUBILITY OF COPOLYMERS IN pH3.0 AND pH6.0 CITRATE-PHOSPHATE BUFFER

| Polymer composition | | Solubility | |
|---|---|---|---|
| | | 2 hours pH 3.0 | 22 hours pH 6.0 |
| TBA-EMA/MMA | 75/25 | Soluble 1½ hrs. | |
| TBA-EMA/MMA | 50/50 | do. | Soluble 2 hrs. |
| TBAEMA/MMA | 25/75 | Insoluble | Insoluble |
| TBAEMA/S | 75/25 | Soluble | |
| TBAEMA/S | 50/50 | Soluble | Insoluble |
| TBAEMA/S | 25/75 | Insoluble | Insoluble |
| TBAEMA/EA | 75/25 | v.soluble and tacky | |
| TBAEMA/EA | 50/50 | do. | |
| TBAEMA/EA | 25/75 | do. | |
| TBAEMA/VA | 75/25 | v.soluble and tacky | |
| TBAEMA/VA | 50/50 | do. | |
| TBAEMA/VA | 25/75 | do. | |
| DMA-EMA/MMA | 75/25 | Soluble 1½ hrs. | |
| DMA-EMA/MMA | 50/50 | Soluble | Insoluble |
| DMAEMA/MMA | 25/75 | Soluble | Insoluble |
| DMAEMA/S | 75/25 | Soluble | |
| DMAEMA/S | 50/50 | Soluble | Insoluble |
| DMAEMA/S | 25/75 | Insoluble 2 hrs. | Insoluble |
| DMA-EMA/EA | 75/25 | v.soluble and tacky | |
| DMA-EMA/EA | 50/50 | do. | |
| DMAEMA/EA | 25/75 | do. | |
| DMA-EMA/VA | 75/25 | v.soluble and tacky | |
| DMA-EMA/VA | 50/50 | do. | |
| DMA-EMA/VA | 25/75 | do. | |

The copolymers with ethyl acrylate and vinyl acetate were very tacky and difficult to handle and therefore were not further investigated. As will be shown hereinafter these monomers are nevertheless useful as internal plasticizers in the terpolymers of this invention.

The tabulated results showed that copolymers containing between approximately 50 and 75 percent of styrene or methyl methacrylate have the solubility characteristics which are considered desirable in feed coatings, i.e. insoluble pH6 for 22–24 hours and soluble at pH3 in less than 2 hours.

On this basis copolymers were prepared with smaller composition changes in the range 50 to 75 percent of styrene or methyl methacrylate in their solubilities tested as before. The results are shown in Table IV.

As indicated in Example 1, the copolymers used in the above trials were freed from residual monomers before testing in order to eliminate any ambiguities in the results obtained. The same results were obtained, however, for copolymers which were used without prior removal of residual monomers.

TABLE IV

SOLUBILITY OF COPOLYMERS IN pH3.0 AND pH6.0 CITRATE-PHOSPHATE BUFFER

| POLYMER COMPOSITION | | Solubility | | | |
|---|---|---|---|---|---|
| | | pH3.0 | | pH 6.0 | |
| | | breakdown | | breakdown | |
| TBA-EMA/MMA | 50/50 | 15 | minutes | 1½ | hours |
| TBA-EMA/MMA | 45/55 | 25 | do. | 3 | do. |
| TBA-EMA/MMA | 40/60 | 25 | do. | 2 | do. |
| TBA-EMA/MMA | 35/65 | ~3½ | hours | 8–24 | do. |
| * TBA-EMA/MMA | 30/70 | ~3½ | hours | >24 | do. |
| TBA-EMA/MMA | 25/75 | 7–22 | do. | >24 | do. |
| TBAEMA/S | 50/50 | 25 | minutes | 5–21 | hours |
| * TBAEMA/S | 45/55 | 75 | do. | >3 | days |
| * TBAEMA/S | 40/60 | 4½ | hours | >3 | days |
| TBAEMA/S | 35/65 | 24 | do. | >3 | days |
| TBAEMA/S | 30/70 | >24 | do. | >3 | days |
| TBAEMA/S | 25/75 | >24 | do. | >3 | days |
| * DMA-EMA/MMA | 25/75 | 2 | hours | >3 | days |
| DMA-EMA/MMA | 20/80 | >24 | do. | >3 | days |
| DMA-EMA/MMA | 15/85 | >24 | do. | >3 | days |
| DMA-EMA/MMA | 10/90 | >24 | do. | >3 | days |
| DMA-EMA/MMA | 5/95 | >24 | do. | >3 | days |
| DMAEMA/S | 50/50 | 20 | minutes | 3–19 | hours |
| * DMAEMA/S | 45/55 | 35 | do. | 3 | days |
| * DMAEMA/S | 40/60 | 60 | do. | >3 | days |
| * DMAEMA/S | 35/65 | <1½ | hours | >3 | days |
| DMAEMA/S | 30/70 | 7–22 | do. | >3 | days |
| DMAEMA/S | 25/75 | 7–23 | do. | >3 | days |

EXAMPLE 3

In vivo solubility testing

From the copolymers listed in Table IV those marked with an asterisk were selected for further testing. Films of each selected polymer were prepared by immersing small strips of 43 mesh (BSS) nylon in a 30 percent solution of the copolymer in methyl ethyl ketone, air-drying the strips for 24 hours and repeating these operations once.

The strips thus prepared were inserted in the rumen of rumen fistulated sheep (supplied by the School of Veterinary Science, University of Melbourne). After 24 hours in the rumen the strips were removed, washed well with water and examined. In each case the polymer remained as a hard, opaque, intact film. Similar strips were inserted into the abomasum of fistulated sheep for three hours. The strips from the rumen testing were also tested in this manner. No film remained on the strips after three hours, indicating that the copolymers were completely dissolved. These results demonstrate that the solubility characteristics of the copolymers are essentially the same in the natural rumen and abomasum juices as in buffer solutions of the same pH values.

EXAMPLE 4

Preparation, coating and testing of methionine tablets a. Preparation of methionine tablets Methionine tablets tend to be extremely watersensitive and coated tablets will explode when placed in water if the polymer coating has any points of strain or pinholes. By use of a more hydrophobic core, this problem can be partially overcome.

Three suitable formulations are given below.

Formulation 1: Methionine (300 gm) and aluminium hydrate (200gm) were mixed together and sieved through 40 mesh screen. Ethyl cellulose (50 gm) was mixed with an equal weight of above powders and slurried with methylated spirits. The slurry was added to the residual powders massed with special methylated spirits and passed through 16 mesh screen. After drying at 120°F the mixture was crushed through a 24 mesh (BS) screen. Calcium stearate (20 gm) was sieved in through 40 mesh screen and thoroughly mixed. Tablets were prepared from the mixture using three-sixteenths inch (ca.5 m.m.) die.

Formulation 2: Methionine (300 gm) magnesium stearate (20 gm - sieved through 40 mesh screen) and "Granule 145" mainly a poly-siloxane — 300 gm, sieved through 24 mesh screen) were mixed and tablets prepared using three-sixteenth die.

Formulation 3; Methionine (300 gm) sugar (200 gm) acacia (100 gm) and magnesium stearate (200 gm) were mxed using the method as for formulation 1 and tablets were prepared using a three-sixteenths inch die.

b. Rumen and abomasum testing of coated methionine tablets

Water-insensitive methionine tablets (formulation 1 above) were coated with the copolymer containing 35 percent DMAEMA and 65 percent styrene (prepared as in example 1) by dipping the tablets into a 30 percent solution of the copolymer in methyl ethyl ketone, air-drying for 24 hours and repeating the procedure once. The tablets were found to retain about 6 percent w/w of the copolymer.

The coated tablets were inserted into the rumen of fistulated sheep together with uncoated tablets as controls. After 24 hours in the rumen the coated tablets were intact and no weight-loss had occurred. The uncoated controls were still quite hard but had lost 30 percent of their initial weight. (The tablets initially contained 50 percent of methionine.)

Coated and uncoated tablets prepared as above were tested for solubility in the abomasum of fistulated sheep. After 3 hours in the abomasum both the coated tablets and the uncoated controls had lost 30 percent of their initial weight, thus demonstrating that the coatings do not inhibit attack on the methionine under the conditions present in the abomasum. Similar results were obtained with the following copolymers.

DMAEMA/MMA 25/75 (with 10 percent dibutyl phthalate as plasticizer)
TBAEMA/S 40/60
TBAEMA/MMA 30/70 (with 10 percent dibutyl phthalate)

EXAMPLE 5

Preparation of terpolymers

The polymers listed in Table V were prepared from the respective monomers using the method described in Example 1, except that addition of the monomer initiator mixture was continued over 2/3 hours.

The terpolymers so produced were used to coat three-sixteenths inch methionine tablets (Formulation 1, Example 4) and the solubility of the coated tablets determined by measuring the weight-losses of the tablets after shaking in buffer solutions of pH3 (for 2 hours) and pH6 (for 24 hours) both at 38°C. The results are shown in Table V.

Those polymers marked with an asterisk were considered to have suitable solubility characteristics for use in accordance with the invention.

Tablets coated with the first 5 polymers listed in Table V were tested in the rumen of rumen fistulated sheep with controls as described in Example 4B. The weight-losses are given in the last column of the table.

TABLE V

| Polymer composition | | % coating | Weight loss (%) | | |
|---|---|---|---|---|---|
| | | | pH3 2 hrs. | pH6 24 hrs. | Rumen |
| Uncoated | | 0 | 26.2 | 54.4 | |
| * DMAEMA/S/EA | 35/55/10 | 10.2 | 25.6 | 0 | 6.2 |
| * do. | 35/50/15 | 3.8 | 23.6 | 0 | 49.2 |
| * do. | 30/60/10 | 7.6 | 11.2 | 0 | 5.4 |
| * do. | 30/55/15 | 6.2 | 19.8 | 0 | 12.2 |
| * do. | 25/60/15 | 6.8 | 2.0 | 0 | 2.1 |
| * do. | 25/55/20 | 5.8 | 4.8 | 7.2 | |
| * DMAEMA/MMA/EA | | | | | |
| | 25/65/10 | 5.0 | 27.2 | 0 | |
| * do. | 25/55/20 | 7.4 | 31.0 | 0 | |
| do. | 25/45/30 | 7.21 | 28.8 | 24.5 | |
| DMAEMA/MMA/VA | | | | | |
| | 20/30/50 | 5.4 | 34.2 | 54.4 | |
| do. | 25/30/45 | 5.0 | 34.2 | 58.0 | |
| DMAEMA/S/VA | 25/30/45 | 2.4 | 30.4 | 36.8 | |
| * do. | 30/50/20 | 5.0 | 25.4 | 15.6 | |
| * do. | 35/45/20 | 7.8 | 31.0 | 11.8 | |

The high weight loss can be partly attributed to the very thin coating of this particular polymer. Also because of this the coating was more susceptible to mechanical damage allowing direct access to the amino acid by the rumen fluid.

In the experiments described above three-sixteenths inch methionine tablets were employed to facilitate handling during manual polymer coating insertion into and removal from the rumen and abomasum of a fistulated aminal. It will be appreciated, however, that tablets of this size cannot be fed to sheep in the normal manner as they will not pass from the rumen into the abomasum. As indicated earlier in this specification, the preferred form of the compositions of the invention is small particles having a maximum dimension of about 0.1 to 1 m.m. (i,e, 16 to 60 mesh (BSS).

Both laboratory and animal feeding trials have shown that the smaller particles behave in similar fashion to the larger tablets.

EXAMPLE 6

In vivo testing of small particles

Methionine particles (containing 25 percent by weight of alumina) of 1 mm average diameter were moulded into preformed black polyvinyl chloride hemispherical shells. The exposed surface of the methionine was coated with a copolymer consisting of 35 percent DMAEMA and 65 percent styrene with an average coating thickness of 0.001 inch (0.025 mm). A further batch of particles was similarly prepared with the terpolymer DMAEMA/S/EA 25/60/15.

The composite particles were fed to sheep which were killed after 24 hours and autopsied. Particles found in the rumen were intact and had lost none of their methionine content. The abomasum contained no intact particles, only the residual p.v.c. shells being found; this indicated complete release of the methionine in the abomasum.

EXAMPLE 7

In situ polymerization

A mixture of the monomers DMAEMA 25 percent, styrene 60 percent and ethyl acrylate 15 percent was dispersed with about 3 times its weight of 1 mm methionine particles in aromatic-free petroleum ether (b.p. 60 – 80°C). An initiator $\alpha,\alpha'$-azoisobutyronitrile; 2 percent by weight of the monomer mixture) was added and the mixture heated under reflux with stirring. The filtered and dried particles were found to be water with a continuous film of the terpolymer.

It will be appreciated that modifications, other than those described above, can be made to the polymers, methods and compositions of the invention. As mentioned above, the polymers of the invention may be modified by the incorporation of a fourth or further monomers; such a polymer might contain, for example, the monomers TBAEMA, styrene, methyl acrylate and vinyl acetate. The polymers may also include inert fillers of particulate or fibrous material which modify their physical properties or active additives which modify their chemical characteristics.

The invention is to be understood to include all such modifications falling within its spirit and scope.

We claim:

1. A nutrient or therapeutic orally administered composition or supplement for ruminant animals, comprising the combination of a nutrient or therapeutic material and coated thereon a copolymer or terpolymer consisting essentially of a. not more than 50 percent by weight of a basic monomer selected from the group consisting of amino substituted acrylates and methacrylates of the general formula:

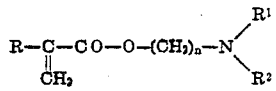

wherein R is hydrogen or a methyl group;
R$^1$ is hydrogen or a straight or branched chain alkyl group having one to four carbon atoms;
R$^2$ is hydrogen or a straight or branched chain alkyl group having one to four carbon atoms;
and $n = 2, 3,$ or $4$; and the balance consisting essentially of b. at least one ethylenically unsaturated compound selected from the group consisting of styrene and methyl styrene vinly acetate and vinyl propionate and normal and branched chain alkyl esters of acrylic and methacrylic acids containing from one to 10 carbon atoms in the alkyl chain, and acrylonitrile,
said combination being of such form that the material is thereby rendered resistant to attack and breakdown within the rumen of the animal but remains susceptible to breakdown and digestion within the abomasum or small intestine of the animal.

2. A composition as claimed in claim 1, wherein the nutrient or therapeutic material is in the form of discrete bodies or particles having a substantially continuous surface coating of the copolymer or terpolymer.

3. A composition as claimed in claim 1, wherein particles of the nutrient or therapeutic material are dispersed throughout a matrix of the copolymer or terpolymer.

4. A composition as claimed in claim 1, in the form of particles having an average diameter of about 0.1 to 1 mm.

5. A method for rendering an orally administered nutrient or therapeutic material resistant to microbial attack within the rumen of ruminant animals comprising providing on said material a coating of one of the copolymers or terpolymers consisting essentially of:

a. not more than 50 percent by weight of a basic monomer selected from the group consisting of amino substituted acrylates and methacrylates of the general formula:

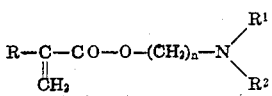

wherein R is hydrogen or a methyl group:
R$^1$ is hydrogen or a straight or branched chain alkyl group having one to four carbon atoms;
R$^2$ is hydrogen or a straight or branched chain alkyl group having one to four carbon atoms;
and $n = 2, 3$ or $4$; and the balance consisting essentially of b. at least one ethylenically unsaturated compound selected from the group consisting of styrene and methyl styrene, vinyl acetate and vinyl propionate and normal and branched chain alkyl esters of acrylic and methacrylic acids containing from one to 10 carbon atoms in the alkyl chain, and acrylonitrile:
the coated product thereby rendered resistant to attack and breakdown within the rumen of the animal while susceptible to breakdown and digestion within the abomasum or small intestine of the animal.

6. A method as claimed in claim 5, wherein discrete bodies or particles of the nutrient or therapeutic material are coated with the copolymer or terpolymer.

7. A method as claimed in claim 5, wherein discrete bodies or particles of the nutrient or therapeutic material are incorporated into a matrix of the copolymer or terpolymer.

8. A method for treating ruminant animals comprising orally administering to the animal a nutrient or therapeutic composition or supplement comprising a combination of a nutrient or a therapeutic material having coated thereon a copolymer or terpolymer consisting essentially of;

a. not more than 50 percent by weight of a basic monomer selected from the group consisting of amino substituted acrylates and methacrylates of the general formula:

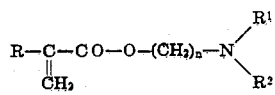

wherein R is hydrogen or a methyl group:
R$^1$ is hydrogen or a straight of branched chain alkyl group having one to four carbon atoms;
R$^2$ is hydrogen or a straight or branched chain alkyl group having one to four carbon atoms;
and $n = 2, 3$ or $4$; and the balance consisting essentially of b. at least one ethylenically unsaturated compound selected from the group consisting of styrene and methyl styrene, vinyl acetate and vinyl propionate, and normal and branched chain alkyl esters of acrylic and methacrylic acids containing from one to 10 carbon atoms in the alkyl chain, and acrylonitrile the coated product thereby rendered resistant to attack and breakdown within the rumen of the animal while susceptible to breakdown and digestion within the abomasum or small intestine of the animal.

\* \* \* \* \*

UNITED STATES PATENT OFFICE
CERTIFICATE OF CORRECTION

Patent No. 3,829,564      Dated December 6, 1974

Inventor(s) Lorraine Anne Merry and David Henry Solomon

It is certified that error appears in the above-identified patent and that said Letters Patent are hereby corrected as shown below:

Column 1, in the heading please insert the priority data as follows: --Claims priority, application Australia Patent No 58,254/69, filed July 18, 1969--

Signed and sealed this 21st day of January 1975

(SEAL)
Attest:

McCOY M. GIBSON JR.
Attesting Officer

C. MARSHALL DANN
Commissioner of Patents